US012481864B2

United States Patent
Baughman et al.

(10) Patent No.: US 12,481,864 B2
(45) Date of Patent: Nov. 25, 2025

(54) GENERATING HYBRID QUANTUM-CLASSICAL NEURAL NETWORK ARCHITECTURES

(71) Applicant: INTERNATIONAL BUSINESS MACHINES CORPORATION, Armonk, NY (US)

(72) Inventors: Aaron K. Baughman, Cary, NC (US); Kavitha Hassan Yogaraj, Bangalore (IN); Arjun Kashyap, Bangalore (IN); Gururaja Hebbar, Frisco, TX (US); Rukhsan Ul Haq, Srinagar (IN); Sudeep Ghosh, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 17/842,365

(22) Filed: Jun. 16, 2022

(65) Prior Publication Data

US 2023/0409873 A1 Dec. 21, 2023

(51) Int. Cl.
*G06N 3/04* (2023.01)
*G06N 3/045* (2023.01)
*G06N 3/084* (2023.01)
*G06N 10/60* (2022.01)

(52) U.S. Cl.
CPC ............ *G06N 3/045* (2023.01); *G06N 3/084* (2013.01); *G06N 10/60* (2022.01)

(58) Field of Classification Search
CPC .. G06F 18/2148; G06F 18/251; G06F 18/214; G06N 20/00
See application file for complete search history.

(56) References Cited

U.S. PATENT DOCUMENTS

| 2018/0049043 | A1 | 2/2018 | Hoffberg |
| 2020/0169396 | A1 | 5/2020 | Neven |
| 2021/0034998 | A1 | 2/2021 | Cao |
| 2022/0180239 | A1* | 6/2022 | Shiba ............... G06N 10/20 |

FOREIGN PATENT DOCUMENTS

| EP | 3120460 B1 | 10/2020 |
| JP | 2019096334 A | 6/2019 |

OTHER PUBLICATIONS

Beer et al., Training deep quantum neural networks; Nature Communications | (2020) 11:808 | https://doi.org/10.1038/s41467-020-14454-2 | www.nature.com/naturecommunications; Total pp. 6 (Year: 2020).*

(Continued)

*Primary Examiner* — Alan Chen
(74) *Attorney, Agent, or Firm* — David K. Mattheis

(57) ABSTRACT

Providing a hybrid neural network architecture by training a plurality of models using a set of training data, the plurality comprising quantum models and classical models, evaluating each model using a common test data set, assigning one or more evaluation metrics to each model according to the evaluation, generating a plurality of networks, each network comprising a combination of the models, evaluating a flow of each network, selecting a network according to the flow, and providing the selected network to a user.

20 Claims, 4 Drawing Sheets

(56) References Cited

OTHER PUBLICATIONS

Alcazar et al., "Quantum Algorithm for Credit Valuation Adjustments", arXiv:2105.12087v1 [quant-ph], May 25, 2021, 23 pps., <https://arxiv.org/pdf/2105.12087.pdf>.

Allcock et al., "Quantum Algorithms for Feedforward Neural Networks", ACM Transactions on Quantum Computing, vol. 1, Issue 1, Dec. 2020, Article No. 6pp 1-24, <https://dl.acm.org/doi/fullHtml/10.1145/3411466>.

Andreev et al., "Quantum Entanglement-based Deep Convolutional Neural Networks", CompSysTech '20: Proceedings of the 21st International Conference on Computer Systems and Technologies '20, Jun. 2020, pp. 66-73, <https://dl.acm.org/doi/pdf/10.1145/3407982.3408013>.

Jooya et al., "Accelerating Neural Network Ensemble Learning Using Optimization and Quantum Annealing Techniques", PMES'17: Proceedings of the Second International Workshop on Post Moores Era Supercomputing, Nov. 2017, pp. 1-7, <https://dl.acm.org/doi/10.1145/3149526.3149528>.

Kumar et al., "Classical Adiabatic Annealing in Memristor Hopfield Neural Networks for Combinatonal Optimization," 2020 International Conference on Rebooting Computing (ICRC), 2020, pp. 76-79, <https://ieeexplore.ieee.org/document/9325382>.

Mell et al., "The NIST Definition of Cloud Computing", National Institute of Standards and Technology, U.S. Department of Commerce, NIST Special Publication 800-145, Sep. 2011, 7 pages.

Yang et al., "Predicting PPI Based on Quantum-inspired Neural Networks," 2019 14th International Conference on Computer Science & Education (ICCSE), 2019, pp. 266-272,<https://ieeexplore.ieee.org/document/8845413>.

Yaxuan et al., "Handwritten numeral recognition with a quantum neural network model," 2017 IEEE 2nd Information Technology, Networking, Electronic and Automation Control Conference (ITNEC), 2017, pp. 712-716, <https://ieeexplore.ieee.org/document/8284824>.

Zhao et al., "QDNN: Deep Neural Networks with Quantum Layers", Received: Nov. 23, 2020, © The Author(s) 2021, Quantum Machine Intelligence (2021) 3: 15, <https://link.springer.com/content/pdf/10.1007/s42484-021-00046-w.pdf>.

* cited by examiner

GENERATING HYBRID QUANTUM-CLASSICAL NEURAL NETWORK ARCHITECTURES

FIELD OF THE INVENTION

The disclosure relates generally to the generation of neural network architectures. The invention relates particularly to the generation of hybrid classical/quantum neural network architectures.

BACKGROUND

Classical computer bits can store information as either a 0 or 1. That the physical world maintains a fixed structure is in keeping with classical mechanics. The exploration of subatomic matter revealed probabilistic states: that matter took on many possible features in different conditions. The field of quantum physics emerged to explore and understand that phenomena.

Quantum computing rests on two cornerstones of quantum mechanics: interference and entanglement. The principle of interference allows a quantum computer to cancel unwanted solutions and enhance correct solutions. Entanglement means the combined state of entangled qubits contains more information than the qubits do independently. Together, these two principles have no classical analogy and modeling them on a classical computer would require exponential resources.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the provision of a hybrid network architecture.

Aspects of the invention disclose methods, systems and computer readable media associated with providing a hybrid neural network architecture by training a plurality of models using a set of training data, the plurality comprising quantum models and classical models, evaluating each model using a common test data set, assigning one or more evaluation metrics to each model according to the evaluation, generating a plurality of networks, each network comprising a combination of the models, evaluating a flow of each network, selecting a network according to the flow, and providing the selected network to a user.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
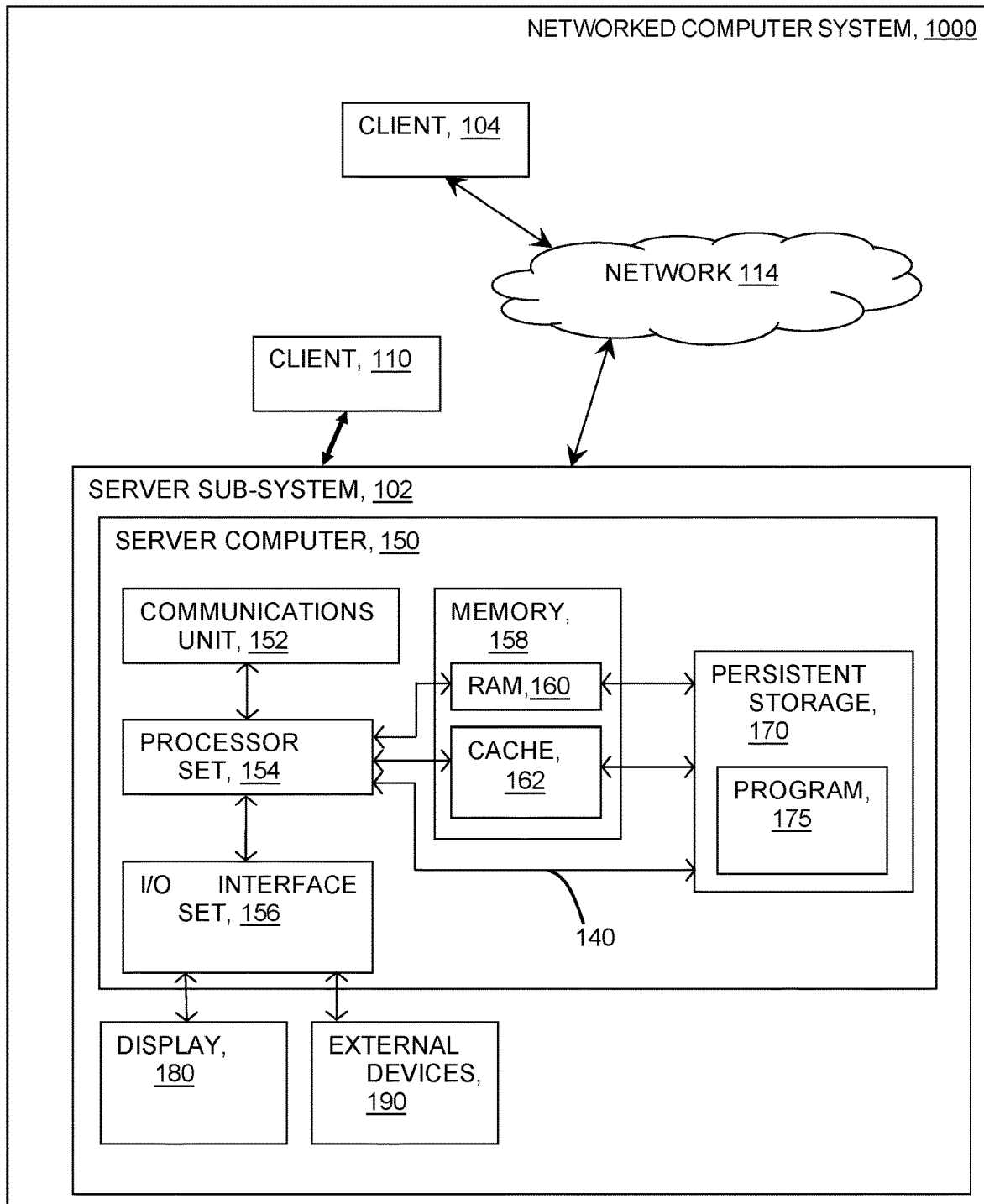
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

The valuation of items and assets from large and diverse data sets is fundamental within economics. Quantum effects play a large role in human cognitive processes. Disclosed embodiments enable quantum mechanics to inject additional patterns emulating human cognition into asset evaluations by using a combination of classical and quantum neural networks. Embodiments enable the configuration of hybrid network architectures which yield classification and other task results emulating human cognition outputs.

Judgements, opinions and complex decisions are made by humans to value items. Many times, such opinions are personal choices. To add similarity to human cognitive decisions so that AI algorithms appear to think and act rationally, disclosed embodiments add quantum computing layers within a neural network. Embodiments emulate general mental abilities such as understanding, awareness and consciousness constructs by integrating quantum layers within a hybrid neural network. Embodiments enable the inclusion of more rational and personalized thought into classical neural networks.

The no-cloning theorem makes the training of classical neural networks and quantum neural networks very different. The theorem states that is impossible to create an independent and identical copy of an arbitrary unknown quantum state. As a result, the training on large scale data is efficient by using an Ancilla bit or unitary operator as contrasted to classical network training using labeled data and gradient back propagation.

Aspects of the present invention relate generally to artificial intelligence algorithms, and more particularly to asset valuation or classification algorithms. Embodiments receive training data sets associated with the intended problem or desired task associated with the output architecture. This problem or task refers to the intended use for the output. As an example, the intended use may to be classify assets of a listing of assets in terms of their current value when considered in terms of post-asset acquisition use. E.g., how will the value of an asset portfolio change after the addition of each potential asset? or, how will the performance of a team change after altering the make-up of the team through adding and removing players? For a user managing a real or fantasy football team, how will the team's performance be affected by the addition of each potential new player?

Classical neural network models provide asset classification according to network weights derived using training data sets. Embodiments enhance such models through the incorporation of quantum network layers which provide additional diversity and explain ability to the classification results. Methods train multiple different hybrid network architectures including quantum and classical models having differing network depths as well as a purely classical model architecture having no quantum component. Methods evaluate each model architecture using a common test data set, and determine an accuracy and diversity of the model, where diversity relates to the degree of differences between the model's classification outputs and the outputs of the purely classical model trained using the same data set and evaluated with the same test data set.

Embodiments combine models associated with portions of an overall task or problem, forming an overall model configured to address the entire task or problem. Methods generate multiple model combinations. Methods evaluate each generated model combination in terms of overall model accuracy and classification output diversity. In an embodiment, methods further evaluate the specificity of generated model combinations to ensure that the models are not overfitting model weights to the training data. Methods selects a generated model combination according to at least the accuracy and diversity, and potentially with regard to the specificity as well. Methods identify and provide the generated model having the best performance in terms of accuracy, diversity, and optionally specificity, for use on new data associated with the intended task.

In accordance with aspects of the invention there is a method for automatically providing a hybrid classification neural network model including both classical and quantum components. Method train multiple different hybrid architectures and evaluate combinations of models configured to address all aspects of an intended task. Method evaluate combinations of models for accuracy and diversity, then provide the optimally performing combination of models for use in association with the task.

Aspects of the invention provide an improvement in the technical field of classification models. Conventional classification systems utilize classical neural network models trained using gradient descent and backpropagation with labeled training data. Such models may lack diversity and any satisfactory level of output explainability. In many cases, such models do not address all possible features of large data sets or provide any real output diversity in evaluating new real-time data sets. The evaluation and addition of quantum network layers to models provides an expansion of the classification decision factors and adds diversity and explainability to the classification outputs.

Aspects of the invention also provide an improvement to computer functionality. In particular, implementations of the invention are directed to a specific improvement to the way classification systems operate, embodied in the addition of quantum network layers to neural network architectures. In embodiments, the system adjusts model architecture by adding quantum layers optimized according to layer depth, accuracy of model classifications, and diversity of outputs. As a result of adjusting the model architectures, a provided model includes quantum elements such that the overall balance of model accuracy and diversity is improved, thereby providing an alternative to strictly classical network architectures. In this manner, embodiments of the invention affect how the classification model system functions (i.e., the classification of new input data) and provides enhanced outputs including explainability using feature importance.

As an overview, a neural network classification system or model is an artificial intelligence application executed on data processing hardware that receives and classifies new input data using network weightings derived during a model training phase. The classification system receives inputs from various sources including input over a network, a corpus of electronic documents or other data, data from a content creator, information from one or more content users, and other such inputs from other possible sources of input. Data storage devices store the corpus of data. A trained model receives the new input data, evaluates and classifies the new input data, and provides an output for the user including classifications of the input data and classification explainability information using input data feature importance. The trained mode includes one or more networks organized according to an intended task. The overall intended task may be divided into a number of subtasks, each subtask in turn may be addressed by a different model of a collection or book of models which address the entire task. Embodiments generate a plurality of differing model architectures according to model layer depths for each subtask and for the overall task. Evaluation of models includes using a common test data set and determining metrics, including accuracy and diversity, for each generated set of models. These metrics enable a relative ranking of the generated model sets. Method then provide a highly ranked model set for use in classifying new data. The new data may include real-time data in need of timely immediate classification.

In an embodiment, one or more components of the system can employ hardware and/or software to solve problems that are highly technical in nature (e.g., training a plurality of neural network models using training data, where the models include classical and quantum network elements, evaluating the models using test data, assigning metrics to models according to the evaluation, generating a plurality of composite networks including combinations of models, evaluating the composite models using test data to determine a composite model having optimal metrics, selecting and providing a composite model etc.). These solutions are not abstract and cannot be performed as a set of mental acts by a human due to the processing capabilities needed to facilitate hybrid network architecture generation, evaluation, and optimization, for example. Further, some of the processes performed may be performed by a specialized computer for carrying out defined tasks related to hybrid network generation, evaluation, and optimization. For example, a specialized computer can be employed to carry out tasks related to hybrid network architecture generation, evaluation and optimization or the like.

In an embodiment, a user seeks a classification model for assistance with an intended task. For example, a user seeks a model to assist in the evaluation for the relative values of a listing of potential assets for acquisition. Each asset has a set of features which may affect the relative valuation of the asset. Environmental features and current portfolio elements may further affect the relative valuations. Values associated with asset and environmental features change over time, necessitating a re-evaluation of the set of potential assets. As an example, for a sports league, a manager of a team must evaluate the relative impact of altering their team's roster by adding new players or varying which players to utilize at different time. The values of the features associated with each player change over time as indicated by performance metrics associated with the players. Evaluating the set of player requires taking into consideration potentially hundreds of features for thousands of players, in real-time as values change, to support rapid decision making as players become available for selection. Disclosed embodiments enable and support selection decisions by continuously re-evaluating player rankings as player attributes change over time. Disclosed systems and method combine classical and quantum models to provide heightened selection criteria and enhanced ranking explainability to support selection decisions.

In an embodiment, systems and methods receive training data relevant to or otherwise associated with the intended use for the desired model. In this embodiment, the training data resembles the new data which will be provided as the input to the developed model. The training data may consist of any data format suitable for expressing the feature variables associated with the intended classification task. In an embodiment, the training data includes a row of data for each potential asset, each row includes multiple columns of feature variable values associated with the asset of the row. The training data includes labels indicating the correct classification for the rows of the data set.

For any received training data set, data customization may be employed to yield a personalized or customized data set. This step may be utilized to reduce the size of input data sets while maintaining a consistent character across the set of customized input data sets. As an example, a large data set may be subdivided into a plurality of smaller sets, each having a portion of the columns of the larger set while retaining all of the rows of the larger set, thereby maintaining the general character of the overall set in each of the smaller sets.

In an embodiment, the method trains a plurality of different topology models using the personalized set of data sets customized to fit the input data parameters of the models. The differing topologies may include an input layer, a quantum layer adapted to receive the set of smaller data sets, where for example, the quantum layer includes multiple elements, each element receiving a single smaller data set such that the quantum layer as a whole receives the entire larger data set. In this manner the full feature set represented by the large set of columns, is received and evaluated using the quantum layer. Each topology also includes a composition layer as the interface between the quantum layer and the classical layers of the topology. In this embodiment, the method enables the assignment of network node weightings to the quantum network values. The no-cloning theorem provides that it is not possible to create an independent and identical copy of an arbitrary unknown quantum state. This enables the use of an ancilla qubit in the training phase of the method where weights for each of the quantum neural networks and classical neural network nodes are determined from evaluating the labeled training data. Each topology further includes one or more classical neural network hidden layers having a specified number of nodes with connections between the nodes of the hidden layers and nodes of the composition layer as well. The topologies also include an activation and output layer where the results of the classification of input data are extracted for the user. In an embodiment, the number of hidden layers constitutes the number of plies, or look-ahead layers, or the depth of the particular topology. The method trains multiple different topologies having differing numbers of hidden layers as well as differing numbers of feature elements within the quantum layer. The method utilizes gradient descent and backpropagation in processing the labeled training data to establish node weights for the hybrid model topologies. The method seeks to minimize a loss function associated with the correct classification of the labelled training data.

In an embodiment, the method also trains a completely classical model topology which lacks the quantum network or composite interface layers. the method utilizes the trained classical layer in evaluating model topology diversity.

The method evaluates the set of trained model topologies using a common test data set of labelled data, where the method utilizes the data labels to determine an accuracy for the classification results provided by each trained model topology. In an embodiment, the method further compares the classification results of each topology to the results of the classical neural network to determine an output diversity for the topology. Models which yield classification results similar to those of the completely classical network have a low level of diversity, while those having output differing from the results provided by the classical topology have a relatively higher diversity. The method evaluates topologies having differing numbers of look-ahead, or hidden layers between the composition layer and the layer where the output results are drawn off for use.

In an embodiment, the method compiles or generates one or more combined networks, where the combination of networks addresses the set of subtasks associated with the overall intended task. In this embodiment, the method combines hybrid as well as classical topologies trained and evaluated for the respective subtasks. The method generates numerous different network combination for evaluation. The method also combines completely classical neural networks for each subtask yielding a completely classical network for the overall intended task. In this embodiment, the method evaluates each of the generated the overall combined networks using the test data set. The method determines a network flow in terms of an accuracy and diversity for each of the generated hybrid topologies, as described above. In this embodiment, the method selects the generated hybrid topology having the highest combination of accuracy and diversity for the different hybrid topologies.

Optionally, the method evaluates a specificity for each of the hybrid topologies. Specificity refers to the number of true negative classifications divided by the sum of the number of true negative classifications and the number of false positive classification. In an embodiment, the method utilizes the specificity value as an indicator that the model has or has not been over-fitted to the training data. Models having a specificity exceeding a threshold value, such as 0.50, tend to be over-fitted to the training data with either too many hidden layers or having the output being drawn after too many hidden layers. For such models, the method evaluates the specificity of other version of the topology having fewer hidden layers or having the outputs drawn off at a different point in the network. In this embodiment, the method considers the model topology flow including accuracy, diversity, and specificity in ranking models to avoid providing an over-fitted model for the intended task.

After ranking the respective generated hybrid network topologies for the intended task, the method provides the rankings of accuracy, diversity, and optionally specificity, for a user's consideration, enabling the user to balance the respective values in selecting a hybrid topology for use with input data for the intended task. In an embodiment, the method evaluates the respective hybrid topologies according to the values of the metrics and provides the highest ranked hybrid topology to the user together with the metric values for the provided topology.

In an embodiment, quantum neural networks include the use of one qubit for each potential feature of the rows of input data. The overall set of input features may be divided enabling presentation of sets of features to smaller quantum systems having fewer qubits. In this embodiment, customized code, such as PYTORCH code, enables the interfacing the quantum neural network layer with the PYTORCH code of the classical neural network layers. This code enables the overall PYTORCH application to address the quantum layer as a classical layer during the training phase utilizing gradient descent and backpropagation to minimize the loss function for the network. In this embodiment, the composition layer concatenates the quantum network evaluations across the set of data features and propagates the concatenated result forward to the classical portion of the network.

(Note: the term "PYTORCH" may be subject to trademark rights in various jurisdictions throughout the world and are used here only in reference to the products or services properly denominated by the marks to the extent that such trademark rights may exist.)

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise hybrid classification network architecture generation and selection program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the hybrid neural network generation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., hybrid neural network generation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
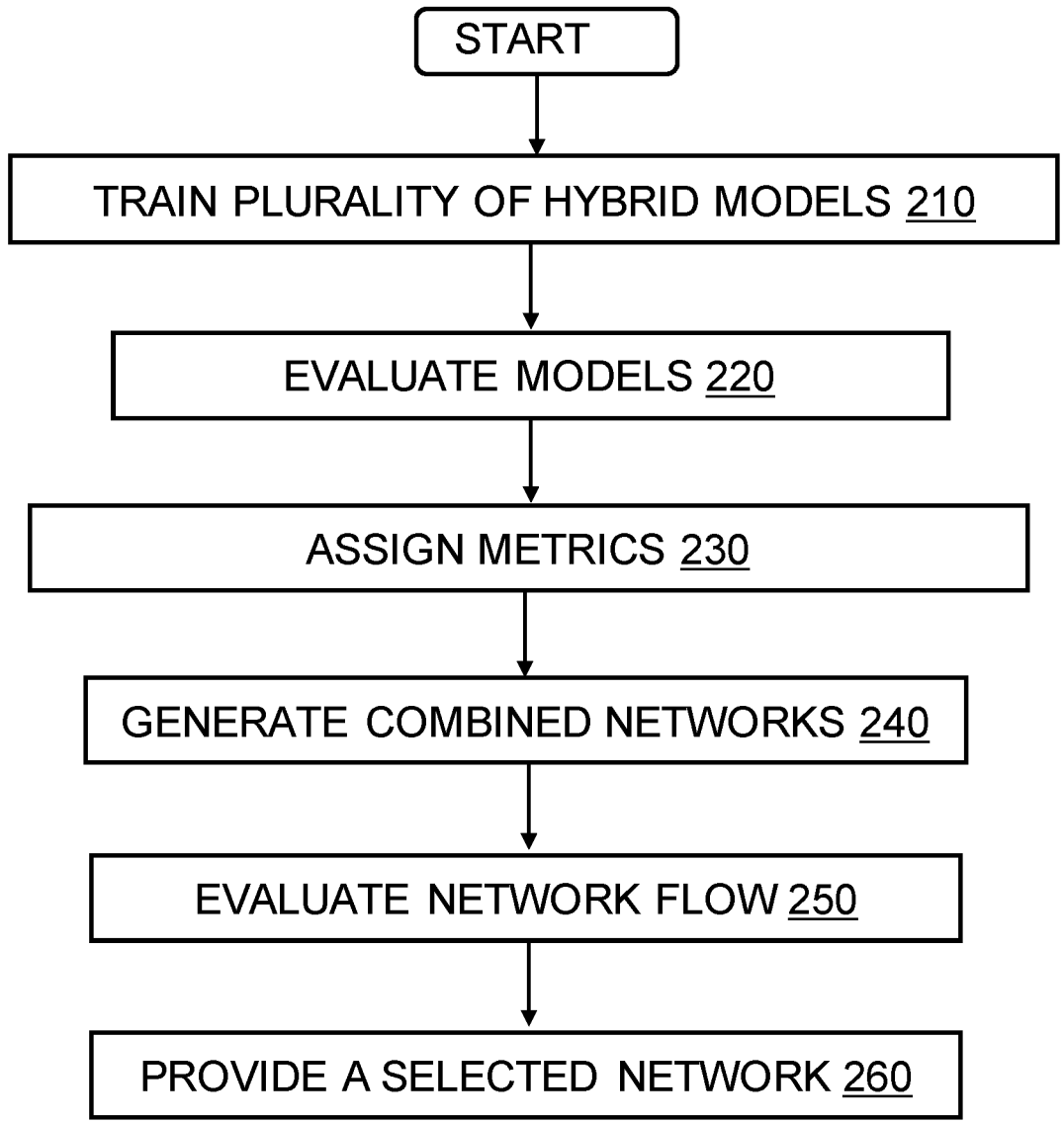
FIG. 2 provides a flowchart depicting an operational sequence, according to an embodiment of the invention.

FIG. 2 provides a flowchart 200, illustrating exemplary activities associated with the practice of the disclosure. After program start, at block 200 the method receives labeled training data and trains a plurality of classical and hybrid classical-quantum network models. In an embodiment, the method reserves a portion of the labeled training data for use as test data in evaluating trained network topologies. The method trains a plurality of network topology models using the training data. The plurality of models include hybrid topologies having quantum, classical and interface layers, as well as input and output layers. In an embodiment, the method utilizes the data labels, gradient descent, and backpropagation to define the network node weights for the trained models. The plurality of models may be configured in association with respective subtasks of an overall intended task for the final model topology.

At block 220, the method evaluates each of the trained model topologies using the labelled test data reserved from the original training data set. The method utilizes the same test data set in evaluating all of the trained model topologies.

At block 230, the method determines an accuracy and diversity for each of the evaluated model topologies. Accuracy relates the success of the model in classifying the labelled data. Diversity provides an indication of the distance between the classification results of a hybrid topology and the classification results of a purely classical neural network topology. Higher diversity indicates a greater degree of difference between the hybrid and classical topologies classification results. In an embodiment, the method generates a vector embedding for the classification results of each topology, the method then determines a separation between the respective vector embeddings as an indication of the separation (diversity) between the respective results.

Examples of methods of determining the separation (diversity) between embeddings include Jaccard distance, Cosine distance, Euclidean distance, Relaxed Word Mover's Distance. Other techniques of determining vector separation beyond those presented, herein, may be applied and not deviate from or limit the features of embodiments of the present invention.

At block 240, the method generates combined networks for the overall task using individual network topologies associated with respective subtasks in an embodiment, the method considers the accuracy and diversity of individual models in combining models to address the overall task. In an embodiment, the method generates a plurality of different combined networks, having multiple different levels of subtask networks in terms of look-ahead, or hidden network layers.

At block 250, the method evaluates the overall accuracy and diversity of the combined network topologies using the labelled test data set. In an embodiment, the method further evaluates the combined network topologies to determine a specificity for the network, where the specificity refers to the ratio of the total number of true negative classifications and the sum of the number of true negatives and the number of false positives. Networks exhibiting too high a specificity indicate that the network has been over-fitted to the training data. For such networks the method considers other related topologies having more or fewer hidden layers, or networks drawing off outputs at differing locations, where the alternative topologies have similar accuracy and diversity ratings but lower specificity ratings. For each combined network topology, the method evaluates the topology in terms of the number of hidden layers considered before drawing off the outputs, to identify the optimal topology configuration in terms of accuracy, diversity and optionally specificity.

At block 260, the method provides the set of topologies to the user together with the respective metric values, for selection by the user of a desired topology having the user's desired balance of accuracy, diversity, and optionally, specificity. In an embodiment, the user specifies desired threshold values of the metrics and the method provides only those topologies satisfying the specified metric threshold values. In an embodiment, the method balances the metrics and provides the user with the hybrid topology best balancing the metric values, for example, the topology having the greatest diversity while also providing a satisfactory level of classification accuracy.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
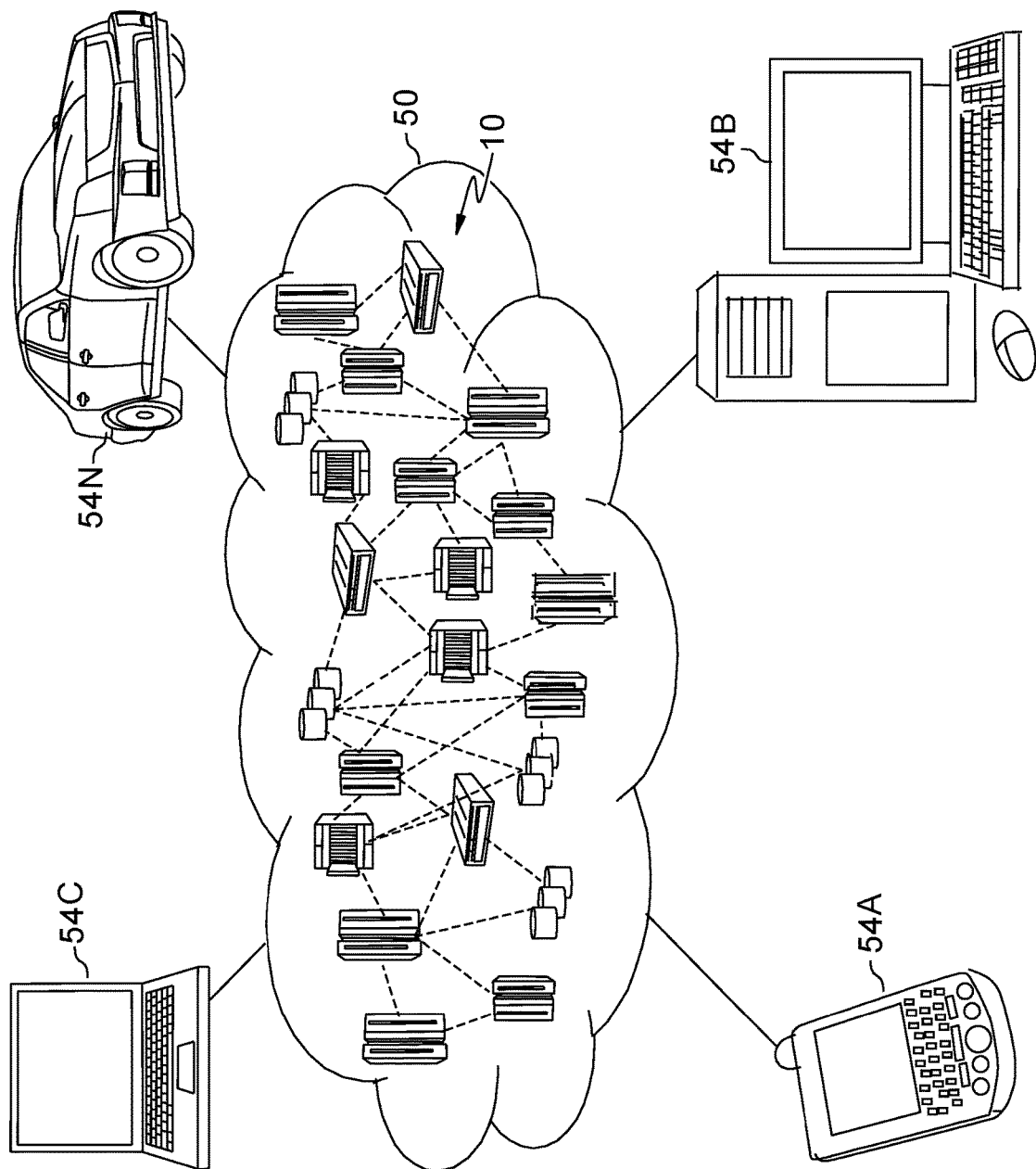
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
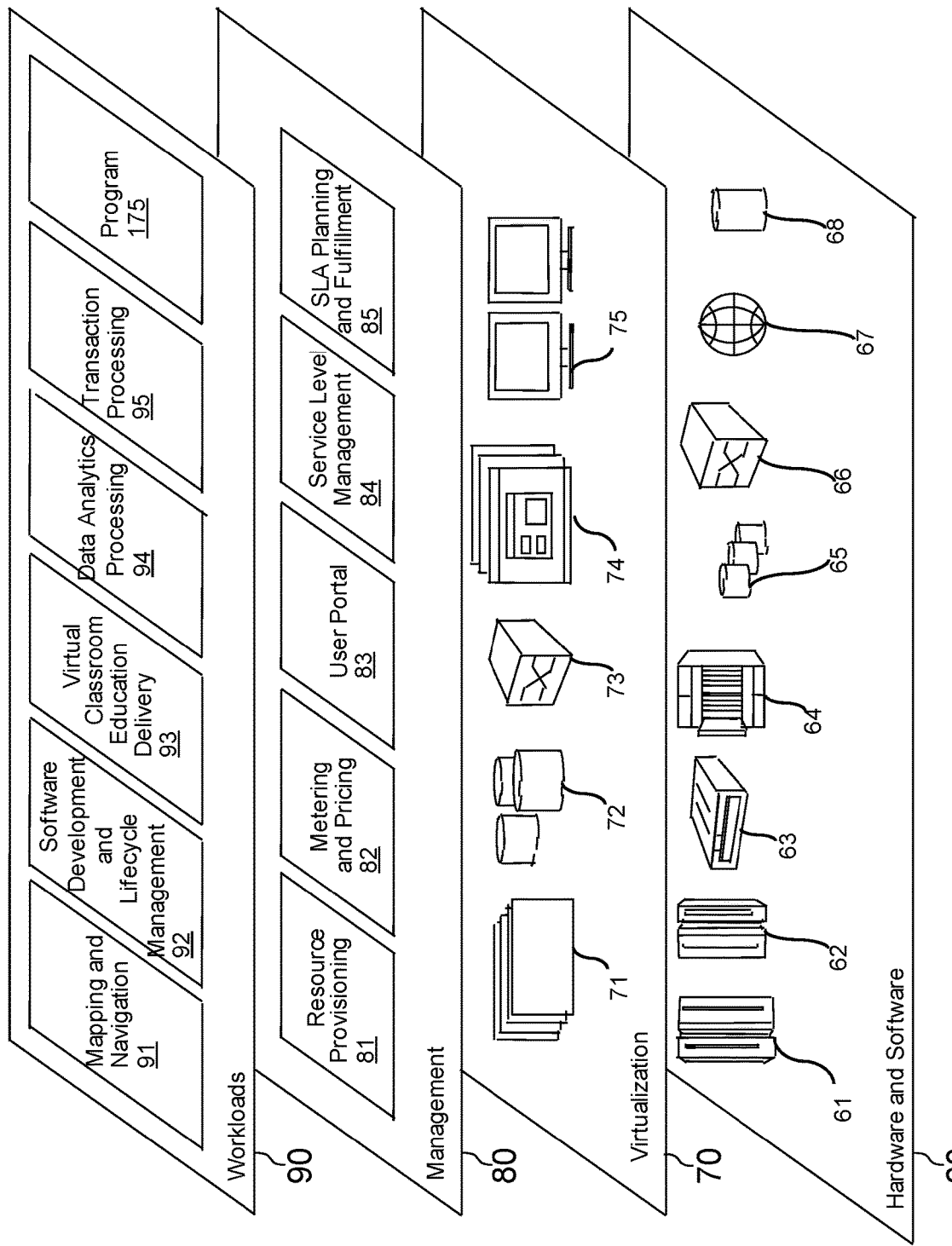
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hybrid neural network generation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for providing a hybrid neural network architecture, the method comprising:
  training, by one or more computer processors, a plurality of models using a set of training data, each model of the plurality comprising a quantum layer, the quantum layer comprising a qubit for each potential training data feature, a classical neural network layer, and a composition layer interface between the quantum layer and the classical neural network layer;
  evaluating, by the one or more computer processors, each model of the plurality of models using a common test data set;
  assigning, by the one or more computer processors, one or more evaluation metrics to each model of the plurality of models according to the evaluation;
  generating, by the one or more computer processors, a plurality of networks, each network of the plurality of networks comprising a combination of models of the plurality of models;

evaluating, by the one or more computer processors, a flow of each network of the plurality of networks;

selecting, by the one or more computer processors, a first network according to the flow; and providing, by the one or more computer processors, the first network to a user.

2. The computer implemented method according to claim 1, wherein evaluating each model of the plurality of models further comprises evaluating each model of the plurality of models for a plurality of look-ahead network layers.

3. The computer implemented method according to claim 1, wherein the training data set comprises personalized training data.

4. The computer implemented method according to claim 1, wherein training the plurality of models comprises training models of the plurality of models on subtasks of a problem.

5. The computer implemented method according to claim 1, further comprising defining, by the one or more computer processors, a network depth according to a specificity.

6. The computer implemented method according to claim 1, further comprising testing, by the one or more computer processors, a specificity of each network of the plurality of networks and selecting a network according to the flow and the specificity.

7. The computer implemented method according to claim 1, wherein evaluating the flow of a network comprises evaluating, by the one or more computer processors, network flow according to changes in model depth.

8. A computer program product for providing a hybrid neural network architecture, the computer program product comprising one or more computer readable storage media and collectively stored program instructions on the one or more computer readable storage media, the stored program instructions comprising:

program instructions to train a plurality of models using a set of training data, each model of the plurality comprising a quantum layer, the quantum layer comprising a qubit for each potential training data feature, a classical neural network layer, and a composition layer interface between the quantum layer and the classical neural network layer;

program instructions to evaluate each model of the plurality of models using a common test data set;

program instructions to assign one or more evaluation metrics to each model of the plurality of models according to the evaluation;

program instructions to generate a plurality of networks, each network of the plurality of networks comprising a combination of models of the plurality of models;

program instructions to evaluate a flow of each network of the plurality of networks;

program instructions to select a first network according to the flow; and program instructions to provide the first network to a user.

9. The computer program product according to claim 8, wherein evaluating each model of the plurality of models further comprises evaluating each model of the plurality of models for a plurality of look-ahead network layers.

10. The computer program product according to claim 8, wherein the training data set comprises personalized training data.

11. The computer program product according to claim 8, wherein training the plurality of models comprises training models of the plurality of models on subtasks of a problem.

12. The computer program product according to claim 8, further comprising program instructions to define a network depth according to a specificity.

13. The computer program product according to claim 8, further comprising program instructions to test a specificity of each network of the plurality of networks; and program instructions to select a network according to the flow and the specificity.

14. The computer program product according to claim 8, wherein evaluating the flow of a network comprises evaluating network flow according to changes in model depth.

15. A computer system for providing a hybrid neural network architecture, the computer system comprising:

one or more computer processors;

one or more computer readable storage devices; and stored program instructions on the one or more computer readable storage devices for execution by the one or more computer processors, the stored program instructions comprising:

program instructions to train a plurality of models using a set of training data, each model of the plurality comprising a quantum layer, the quantum layer comprising a qubit for each potential training data feature, a classical neural network layer, and a composition layer interface between the quantum layer and the classical neural network layer;

program instructions to evaluate each model of the plurality of models using a common test data set;

program instructions to assign one or more evaluation metrics to each model of the plurality of models according to the evaluation;

program instructions to generate a plurality of networks, each network of the plurality of networks comprising a combination of models of the plurality of models;

program instructions to evaluate a flow of each network of the plurality of networks;

program instructions to select a first network according to the flow; and program instructions to provide the first network to a user.

16. The computer system according to claim 15, wherein evaluating each model of the plurality of models further comprises evaluating each model of the plurality of models for a plurality of look-ahead network layers.

17. The computer system according to claim 15, wherein the training data set comprises personalized training data.

18. The computer system according to claim 15, wherein training the plurality of models comprises training models of the plurality of models on subtasks of a problem.

19. The computer system according to claim 15, further comprising program instructions to define a network depth according to a specificity.

20. The computer system according to claim 15, further comprising program instructions to test a specificity of each network; and program instructions to select a network according to the flow and the specificity.

* * * * *